United States Patent
Charles et al.

[11] Patent Number: 5,856,413
[45] Date of Patent: Jan. 5, 1999

[54] POLYCARBONATE COMPOSITIONS HAVING MOLD-RELEASE PROPERTIES

[75] Inventors: John J. Charles, Upper St. Clair, Pa.; Charles E. Lundy, Summerville, S.C.; Robson Mafoti, Temple, Tex.

[73] Assignee: Bayer Corporation, Pittsburgh, Pa.

[21] Appl. No.: 881,448

[22] Filed: Jun. 24, 1997

Related U.S. Application Data

[63] Continuation-in-part of Ser. No. 640,043, Apr. 30, 1996, abandoned.

[51] Int. Cl.$^6$ .................................................... C08F 283/02
[52] U.S. Cl. .......................... 525/466; 524/290; 524/306; 524/315; 524/322; 524/339
[58] Field of Search ............................. 525/466; 524/290, 524/306, 315, 322, 339

[56] References Cited

U.S. PATENT DOCUMENTS

| | | | |
|---|---|---|---|
| 3,784,595 | 1/1974 | Schirmer et al. | 260/18 TN |
| 3,836,499 | 9/1974 | Schirmer et al. | 260/31.2 R |
| 4,007,150 | 2/1977 | Adelmann et al. | 260/30.8 R |
| 4,425,458 | 1/1984 | Lindner et al. | 524/314 |
| 5,001,180 | 3/1991 | Lundy et al. | 524/311 |
| 5,210,124 | 5/1993 | Hovatter et al. | 524/311 |
| 5,246,999 | 9/1993 | Wielgosz et al. | 524/310 |
| 5,484,874 | 1/1996 | Ishiwa et al. | 528/196 |
| 5,596,034 | 1/1997 | Krishnan et al. | 524/311 |

*Primary Examiner*—Randy Gulakowski
*Attorney, Agent, or Firm*—Joseph C. Gil; Aron Preis

[57] ABSTRACT

A thermoplastic molding composition comprising polycarbonate and a comples ester are disclosed. The ester which conforms to

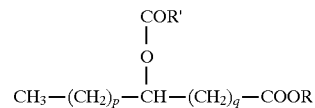

wherein p is an integer of 2 to 8, q is an integer of 7 to 13 and R and R' independently denote a $C_xH_{2x+1}$-group, where x is an integer of 8 to 24, with the proviso that R is linear, was found to impart to the composition excellent mold filling and release properties.

10 Claims, No Drawings

POLYCARBONATE COMPOSITIONS HAVING MOLD-RELEASE PROPERTIES

This application is a Continuation-In-Part of application Ser. No. 08/640,043 filed Apr. 30, 1996 now abandoned.

FIELD OF THE INVENTION

The invention relates to thermoplastic molding compositions and in particular to compositions based on polycarbonates.

SUMMARY OF THE INVENTION

A thermoplastic molding composition comprising polycarbonate and a complex ester are disclosed. The ester which conforms to

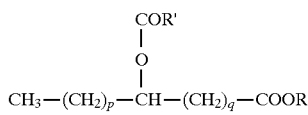

wherein p is an integer of 2 to 8, q is an integer of 7 to 13 and R and R' independently denote a $C_xH_{2x+1}$-group, where x is an integer of 8 to 24, with the proviso that R is linear, was found to impart to the composition excellent mold filling and release properties.

BACKGROUND OF THE INVENTION

Polycarbonates are widely used engineering thermoplastics because they feature an attractive set of physical and mechanical properties. A disadvantage is, however, associated with their processing in that they have poor release properties. In injection molding application, this disadvantage translates to relatively long cycle times. Shorter cycle times have been attained by injection molding at higher temperatures and by using mold release agents. Long chain aliphatic carboxylic acid esters of monohydric and trihydric alcohols have been incorporated in poly-carbonate compositions to improve the release properties of the compositions: U.S. Pat. No. 4,007,150 disclosed the use of perfluoro-alkanesulphonic acid amides and/or cyclic ammonium salts of such acids as mold release agents. Relevant technology has been disclosed in U.S. Pat. No. 3,784,595 which refers to polycarbonate molding compositions having improved release properties containing an ester of trihydric alcohol and a $C_{10-22}$-saturated aliphatic carboxylic acid. These esters are said to be effective mold release agents, without at the same time causing a measurable quality lowering degradation of the polycarbonate. Also relevant in this context is U.S. Pat. No. 3,836,499 which disclosed esters of univalent $C_{10-35}$-alcohols and aliphatic saturated $C_{8-25}$-mono-carboxylic acids.

DETAILED DESCRIPTION OF THE INVENTION

Aromatic polycarbonates within the scope of the present invention include homopolycarbonates and copolycarbonates and mixtures thereof.

The suitable polycarbonates have a weight average molecular weight of 10,000–200,000, preferably 20,000–80,000 and their melt flow rate, per ASTM D-1238 at 300° C., is about 1 to about 65 g/10 min., preferably about 2–24 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the invention conform to the structural formulae (1) or (2).

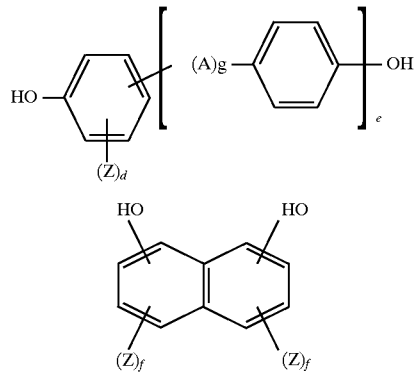

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO—, or —SO$_2$—or a radical conforming to

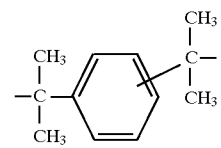

e and g both denote the number 0 to 1; Z denotes F, Cl, Br or $C_{1-4}$-alkyl and if several Z radicals are substituents in one aryl radical, they may be identical or different from one another;

d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxyphenyl)-diisopropylbenzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxybenzophenone, 2,4-bis-(3,5-dimethyl-4-hydroxyphenyl)-cyclohexane, α,α'-bis-(3,5-dimethyl-4-hyd roxyphenyl)-p-diisopropylbenzene and 4,4'-sulfonyl diphenol.

Examples of particularly preferred aromatic bisphenols are 2,2,-bis-(4-hydroxyphenyl)-propane, 2,2-bis-(3,5-dimethyl4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05–2.0 mol % (relative to the bisphenols) of polyhydroxyl compounds.

Polycarbonates of this type have been described, for example, in German Offenlegungsschriften 1,570,533; 2,116,974 and 2,113,374; British Patents 885,442 and 1,079, 821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-iso-propylidine)-phenol; 2,6-bis-(2'-dihydroxy-5'-methylbenzyl)-4-methylphenol; 2,4-dihydroxybenzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references, U.S. Pat. Nos. 3,028,365; 2,999,846; 3,153,008; and 2,991, 273.

The preferred process for the preparation of polycarbonates is the interfacial polycondensation process.

Other methods of synthesis in forming the polycarbonates of the invention such as disclosed in U.S. Pat. No. 3,912, 688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5–24, 13–16, 7.5–13.0 and 3.5–6.5 g/10 min., respectively. These are products of Bayer Corporation of Pittsburgh, Pa.

A polycarbonate resin suitable in the practice of the invention is known and its structure and methods of preparation have been disclosed, for example in U.S. Pat. Nos. 3,030,331; 3,169,121; 3,395,119; 3,729,447; 4,255,556; 4,260,731; 4,369,303 and 4,714,746 all of which are incorporated by reference herein.

The mold release agent in accordance with the invention is a complex ester conforming to

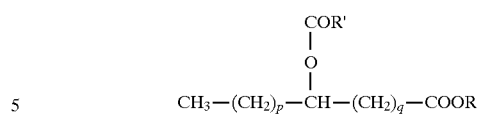

wherein p is an integer of 2 to 8, preferably 4 to 6, q is an integer of 7 to 13, preferably 9 to 11 and R and R' independently denote a $C_xH_{2x+1}$-group, where x is an integer of 8 to 24, preferably 14 to 20, with the proviso that R is linear. Advantageously, the complex ester is stearyl stearoyl stearate. Complex esters suitable in the context of the present invention are available in commerce; for instance, under the tradename HETESTER from Bernel Chemical Company, Inc.

The amount of the complex ester added to the carbonate polymer is a positive amount which is sufficient to impart to the composition improved mold release property in comparison to a corresponding composition which does not contain the complex ester. Preferably, the composition of the invention contains about 0.1 to 2, more preferably 0.2 to 1.0 percent relative to the weight of the carbonate polymer.

The incorporation of the complex ester into the polycarbonate may be effected by using standard techniques. These include tumble blending the complex esters which are normally in the form of waxy solids or liquids with polycarbonate pellets followed by extruding (at about 280–300° C.) to form a strand which is then pelletized. Alternatively, the complex ester may be metered in the form of a molten liquid directly into the polycarbonate melt in an extruder. A further alternative is represented by incorporating the mold release agent in the solid polycarbonate during the manufacture of the resin. In that case, the complex ester is either admixed as a solution in a solvent with the polycarbonate solution prior to reaching a devolatilization screw, or is metered without solvent directly into the polycarbonate melt.

The method for determination of release force for the purpose of comparing the efficacies of mold agents is well known. Essentially, the injection cylinder of an injection molding machine, for instance a 4 oz. Newbury, is equipped with a pressure transducer to measure and record the force during the ejection phase of molding a 90 mm diameter flat disc. The mold is characterized in that it has four intersecting 5 mm high by 1–2 mm thick tapered ribs laid out in a grid pattern. There are 4 ejector pins at the intersections of the ribs and 4 ejector pins along the perimeter of the disc. The mold is designed with minimum draft on the ribs to promote the tendency of the part to stick to the core. The moldings are injected at a melt temperature of 280° C. with a cycle time of 45 seconds between injections. The mold is maintained at a set point temperature of 79.5° C. The release force values reported below represent averages of the last 12 consecutive mold ejection hydraulic pressure values taken after the mold has stabilized, usually after 25–30 ejections.

The invention is further illustrated but is not intended to be limited by the following examples in which all parts and percentages are by weight unless otherwise specified.

EXAMPLES

Experimental

Example 1

A complex ester useful in the present invention was prepared as follows:

Stage one: into a reaction vessel of suitable size fitted with a stirrer, temperature controller, distillation column, variable ratio reflux condenser and nitrogen blanketing are added 542 grams (g) of Stearic Acid (acid number 203, 2.0 mole) and 600 g of 12-Hydroxystearic Acid (acid number 179, 2.0 mole) and 0.114 g Dibutyltin Oxide catalyst. The stirred molten mixture is heated to 215° C. under nitrogen purge to facilitate the removal of water of reaction. Nitrogen purging is discontinued when the temperature of the water of reaction vapor pressure in the packed distillation column drops below 80° C. at which point full vacuum is applied. The molten mixture is maintained under full vacuum at 215° C. with stirring until the acid number has fallen to about 110 (approximately 8 hours) at which point the first stage of the reaction is complete.

Stage two: The partial ester formed above is converted to the complex ester by reacting the contents of the reaction vessel in stage one with 665 grams of ALFOL 20+Alcohol (roughly a 4:2:1 mixture of Eicosonal, Docosanol, and Tetracosanol from Vista Chemical Co.). This reaction is conducted over a period of 5 hours at a temperature of 215° C. with stirring and nitrogen purge to facilitate the removal of water of reaction. When the temperature in the packed distillation column drops below 80° C., full vacuum is applied and nitrogen purge discontinued. The molten mixture is maintained under full vacuum at 215° C. with stirring until the acid number has fallen to 3 or less (approximately 7 hours). A tan waxy solid having a melting point about 40° C. was obtained.

Example 2

A complex ester useful in the present invention was prepared in two stages as follows.

Stage one: into a reaction vessel of suitable size fitted with a stirrer, temperature controller, distillation column, variable ratio reflux condenser and nitrogen blanketing are added 2034 g of Stearic Acid (acid number 203, 7.5 mole) and 2251 g of 12-Hydroxystearic Acid (acid number 179, 7.5 mole) and 0.4 g Dibutyltin Oxide catalyst. The stirred molten mixture is heated to 205° C. under nitrogen purge to facilitate the removal of water of reaction. Nitrogen purging is discontinued when the temperature of the water of reaction vapor pressure in the packed distillation column drops below 80° C. at which point full vacuum is applied. The molten mixture is maintained under full vacuum at 200°–206° C. with stirring until the acid number has fallen to about 110 (approximately 10 hours) at which point the first stage of the reaction is complete.

Stage two: the partial ester formed above is converted to the complex ester by reacting the contents of the reaction vessel in stage one with 2123 grams of Stearyl Alcohol. This reaction is conducted over a period of 15 hours at a temperature of 205° C. with stirring and nitrogen purge or vacuum to facilitate the removal of water of reaction until the acid number has fallen to 7 or less. A tan waxy solid having a melting point about 40° C. was obtained.

Example 3

Compositions in accordance with the invention have been prepared and their mold release properties determined. The results are summarized below. In preparing the compositions, the carbonate polymer was a homopolycarbonate based on bisphenol-A and characterized in that its melt flow index is 19 g/10 min. as determined in accordance with ASTM D-1238 (Makrolon 2508–1112 resin, a commercial product of Bayer Corporation); the mold release agent representative of the present invention referred to as MSE in the table was the complex ester prepared in accordance with Example 1 above. A comparative example was prepared where the mold release agent was trimethylol propane tripelargonate (referred to in the table as TPT). All the compositions contained a small amount (0.10% by weight) of a thermal stabilizer having no criticality in the present invention. The compositions contained 99.15% by weight polycarbonate and about 0.74% by weight of the indicated mold release agent.

TABLE 1

| | Melt Flow Rates | | |
|---|---|---|---|
| Composition | 1 | 2 | 3 |
| release agent | none | MSE | TPT |
| MFR[1] | | | |
| standard | 23.9 | 26.4 | 24.8 |
| after 20 min. hold | 24.3 | 30.8 | 26.7 |

[1]melt flow rate at g/10 min. per ASTM D-1238 measured at 300° C., 1200 g load.

TABLE 2

| | Release Force (bar) | | | |
|---|---|---|---|---|
| Release agent Content, % | 0.25 | 0.50 | 0.75 | 1.00 |
| type | | | | |
| TPT | 16.5 | 15.0 | 14.7 | 14.2 |
| MSE | 16.0 | 14.8 | 13.0 | 12.8 |

The results point to that the release agent of the invention is effective in reducing the release force in proportion to its content in the composition. Set against the corresponding Release Force of a polycarbonate composition containing no release agents (25.5), the results demonstrate the agent of the invention to be more effective than TPT which is a known release agent for polycarbonate resins.

The edge color of compositions containing 0.75% of the release agent of the invention (MSE) was yellowish; the corresponding compositions containing TPT were clear.

The mold filling characteristics of the inventive composition have been evaluated as shown below. The inventive composition (Composition B below), containing polycarbonate and 0.75% of stearyl stearoyl stearate was evaluated in comparison to Makrolon 2558 composition (Composition A below), a release grade polycarbonate composition having largely similar melt flow value. The results are shown below:

TABLE 3

| | melt flow rate | Melt viscosity at 1000 sec[1], Pa. sec. | | |
|---|---|---|---|---|
| Material | g/10 min. | 280° C. | 300° C. | 320° C. |
| A | 17 | 373 | 245 | n.d.[1] |
| B | 17 | 228 | 111 | 51 |

[1]- not determined

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising carbonate polymer and an effective amount of a complex ester conforming to

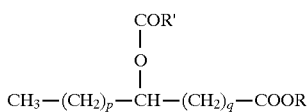

wherein p is an integer of 2 to 8, q is an integer of 7 to 13, and R and R' independently denote a $C_xH_{2x+1}$-group, where x is an integer of 8 to 24, with the proviso that R is linear, said amount being sufficient to impart to the composition improved mold release property in comparison to a corresponding composition which contains none of said complex ester.

2. The composition of claim 1 wherein p is an integer of 4 to 6.

3. The composition of claim 1 wherein q is an integer of 9 to 11.

4. The composition of claim 1 wherein x is an integer of 14 to 20.

5. The composition of claim 1 wherein complex ester is stearyl stearoyl stearate.

6. The composition of claim 1 wherein said carbonate polymer is a homopolycarbonate based on bisphenol-A.

7. The composition of claim 1 wherein said amount being about 0.1 to 2 percent relative to the weight of said carbonate polymer.

8. The composition of claim 1 wherein said amount being about 0.2 to 1.0 percent relative to the weight of said carbonate polymer.

9. A thermoplastic molding composition comprising a homopolycarbonate based on bisphenol-A and about 0.2 to 1.0 percent of a complex ester conforming to

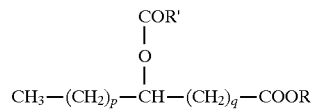

wherein p is an integer of 4 to 6, q is an integer of 9 to 11, and R and R' independently denote a $C_xH_{2x+1}$-group, where x is an integer of 14 to 20, with the proviso that R is linear.

10. The composition of claim 9 wherein complex ester is stearyl stearoyl stearate.

* * * * *